United States Patent [19]
Moore

[11] Patent Number: 6,102,417
[45] Date of Patent: Aug. 15, 2000

[54] DUAL SHOCK ABSORBER KIT

[76] Inventor: David S. Moore, 1064 Carl Hayden Dr., Sierra Vista, Ariz. 85635

[21] Appl. No.: 09/146,560

[22] Filed: Sep. 3, 1998

[51] Int. Cl.[7] ...................................................... B60G 9/04
[52] U.S. Cl. .................................. 280/124.1; 280/124.157
[58] Field of Search ........................ 280/124.157, 124.1, 280/124.163, 124.17

[56] References Cited

U.S. PATENT DOCUMENTS

| | | |
|---|---|---|
| 3,356,176 | 12/1967 | Herr . |
| 4,168,844 | 9/1979 | Smith . |
| 4,678,204 | 7/1987 | Hetherington . |
| 5,433,470 | 7/1995 | Long . |

*Primary Examiner*—Paul N. Dickson

[57] ABSTRACT

A dual shock absorber kit for mounting to the rear end of a vehicle, especially a truck, for better handling of the vehicle when driving. The kit includes first and second pairs of shock absorbers each comprising front and back shock absorbers. First and second axle mounting brackets are also provided for mounting to a rear wheel axle of a vehicle. A cross bar extends between a pair of side rails of a support frame of the vehicle. One end of the front shock absorber of each of the pairs of shock absorbers is coupled to an associated axle mounting bracket while the other end of the front shock absorber of each of the pairs of shock absorbers is coupled to the side rail of the support frame of the vehicle adjacent the associated axle mounting bracket. One end of the back shock absorber of each of pair of shock absorbers is coupled to the associated axle mounting bracket while the other end of the back shock absorber of each pair of shock absorbers is coupled to the cross bar at a position between the side rails of the support frame of the vehicle.

9 Claims, 4 Drawing Sheets

DUAL SHOCK ABSORBER KIT

BACKGROUND OF THE INVENTION

1. Field of the Invention

The present invention relates to shock absorber systems for vehicles and more particularly pertains to a new dual shock absorber kit for mounting to the rear end of a vehicle, especially a truck, for better handling of the vehicle when driving.

2. Description of the Prior Art

The use of shock absorber systems for vehicles is known in the prior art. More specifically, shock absorber systems for vehicles heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,242,238; U.S. Pat. No. 5,431,363; U.S. Pat. No. 5,145,204; U.S. Pat. No. 5,169,171; U.S. Pat. No. 5,255,936; and U.S. Pat. No. 4,087,115.

While these devices fulfill their respective, particular objectives and requirements, the aforementioned patents do not disclose a new dual shock absorber kit. The inventive device includes first and second pairs of shock absorbers each comprising front and back shock absorbers. First and second axle mounting brackets are also provided for mounting to a rear wheel axle of a vehicle. A cross bar extends between a pair of side rails of a support frame of the vehicle. One end of the front shock absorber of each of the pairs of shock absorbers is coupled an associated axle mounting bracket while the other end of the front shock absorber of each of the pairs of shock absorbers is coupled to the side rail of the support frame of the vehicle adjacent the associated axle mounting bracket. One end of the back shock absorber of each of pair of shock absorbers is coupled to the associated axle mounting bracket while the other end of the back shock absorber of each pair of shock absorbers is coupled to the cross bar at a position between the side rails of the support frame of the vehicle.

In these respects, the dual shock absorber kit according to the present invention substantially departs from the conventional concepts and designs of the prior art, and in so doing provides an apparatus primarily developed for the purpose of mounting to the rear end of a vehicle, especially a truck, for better handling of the vehicle when driving.

SUMMARY OF THE INVENTION

In view of the foregoing disadvantages inherent in the known types of shock absorber systems for vehicles now present in the prior art, the present invention provides a new dual shock absorber kit construction wherein the same can be utilized for mounting to the rear end of a vehicle, especially a truck, for better handling of the vehicle when driving.

The general purpose of the present invention, which will be described subsequently in greater detail, is to provide a new dual shock absorber kit apparatus and method which has many of the advantages of the shock absorber systems for vehicles mentioned heretofore and many novel features that result in a new dual shock absorber kit which is not anticipated, rendered obvious, suggested, or even implied by any of the prior art shock absorber systems for vehicles, either alone or in any combination thereof.

To attain this, the present invention generally comprises first and second pairs of shock absorbers each comprising front and back shock absorbers. First and second axle mounting brackets are also provided for mounting to a rear wheel axle of a vehicle. A cross bar extends between a pair of side rails of a support frame of the vehicle. One end of the front shock absorber of each of the pairs of shock absorbers is coupled an associated axle mounting bracket while the other end of the front shock absorber of each of the pairs of shock absorbers is coupled to the side rail of the support frame of the vehicle adjacent the associated axle mounting bracket. One end of the back shock absorber of each of pair of shock absorbers is coupled to the associated axle mounting bracket while the other end of the back shock absorber of each pair of shock absorbers is coupled to the cross bar at a position between the side rails of the support frame of the vehicle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new dual shock absorber kit apparatus and method which has many of the advantages of the shock absorber systems for vehicles mentioned heretofore and many novel features that result in a new dual shock absorber kit which is not anticipated, rendered obvious, suggested, or even implied by any of the prior art shock absorber systems for vehicles, either alone or in any combination thereof.

It is another object of the present invention to provide a new dual shock absorber kit which may be easily and efficiently manufactured and marketed.

It is a further object of the present invention to provide a new dual shock absorber kit which is of a durable and reliable construction.

An even further object of the present invention is to provide a new dual shock absorber kit which is susceptible of a low cost of manufacture with regard to both materials and labor, and which accordingly is then susceptible of low prices of sale to the consuming public, thereby making such dual shock absorber kit economically available to the buying public.

Still yet another object of the present invention is to provide a new dual shock absorber kit which provides in the apparatuses and methods of the prior art some of the advantages thereof, while simultaneously overcoming some of the disadvantages normally associated therewith.

Still another object of the present invention is to provide a new dual shock absorber kit for mounting to the rear end of a vehicle, especially a truck, for better handling of the vehicle when driving.

Yet another object of the present invention is to provide a new dual shock absorber kit which includes first and second pairs of shock absorbers each comprising front and back shock absorbers. First and second axle mounting brackets are also provided for mounting to a rear wheel axle of a vehicle. A cross bar extends between a pair of side rails of a support frame of the vehicle. One end of the front shock absorber of each of the pairs of shock absorbers is coupled an associated axle mounting bracket while the other end of the front shock absorber of each of the pairs of shock absorbers is coupled to the side rail of the support frame of the vehicle adjacent the associated axle mounting bracket. One end of the back shock absorber of each of pair of shock absorbers is coupled to the associated axle mounting bracket while the other end of the back shock absorber of each pair of shock absorbers is coupled to the cross bar at a position between the side rails of the support frame of the vehicle.

Still yet another object of the present invention is to provide a new dual shock absorber kit that helps better load distribution on the rear end of a truck carrying a heavy load.

Even still another object of the present invention is to provide a new dual shock absorber kit that provides more stability and durability to the rear end of a truck.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
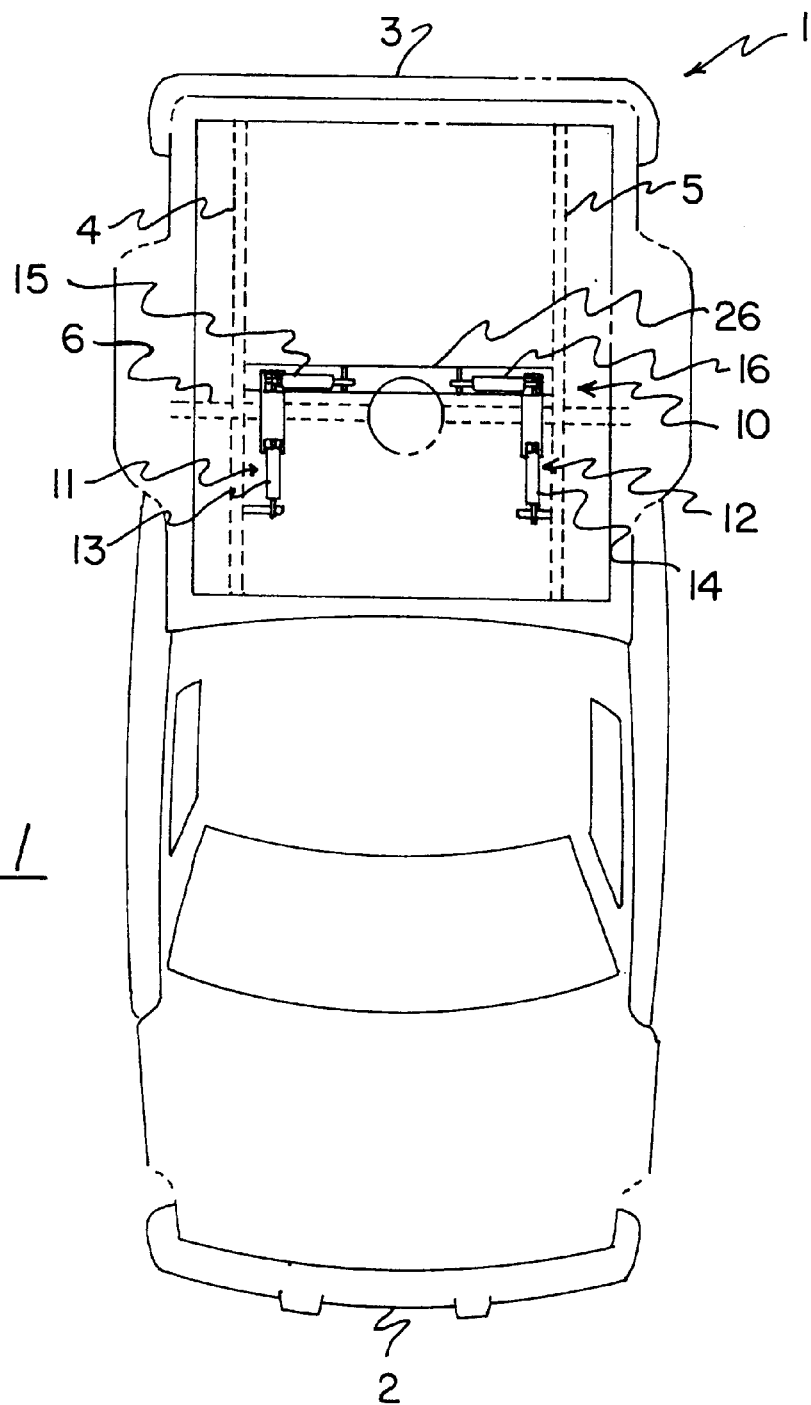
FIG. 1 is a schematic top view of a new dual shock absorber kit according to the present invention.
Figure 2:
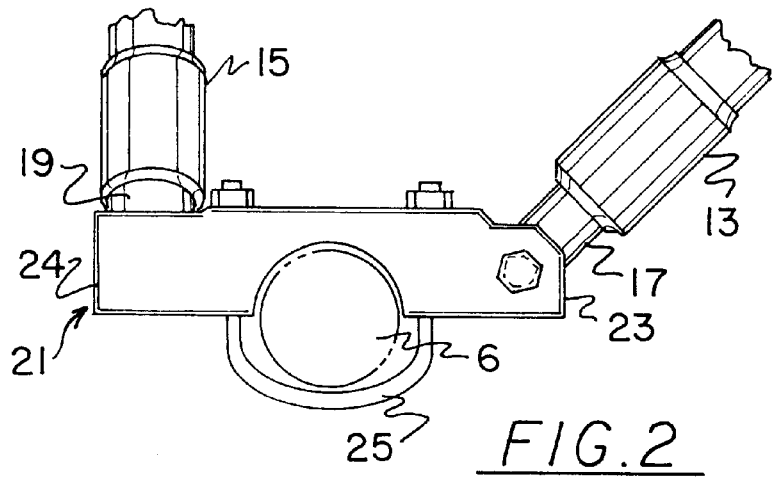
FIG. 2 is a schematic side view of the present invention.
Figure 3:
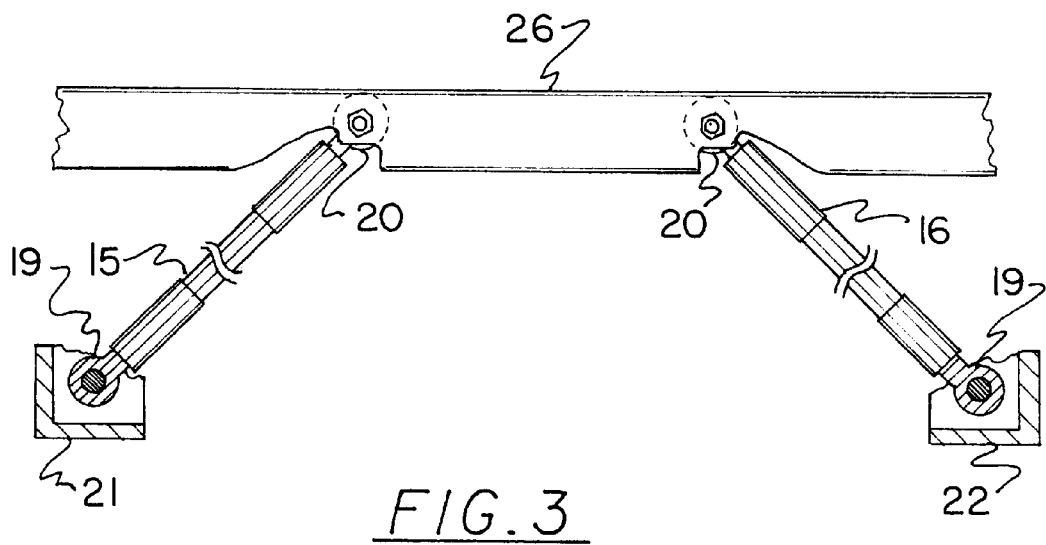
FIG. 3 is a schematic side view of the back shock absorbers of the present invention.
Figure 4:
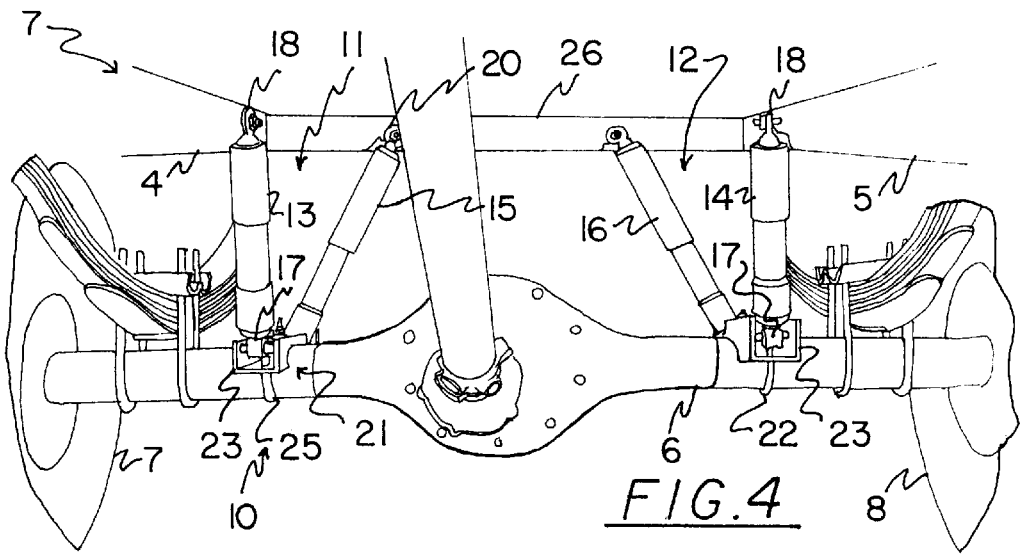
FIG. 4 is a schematic perspective view of the underside of the vehicle with the present invention.
Figure 5:
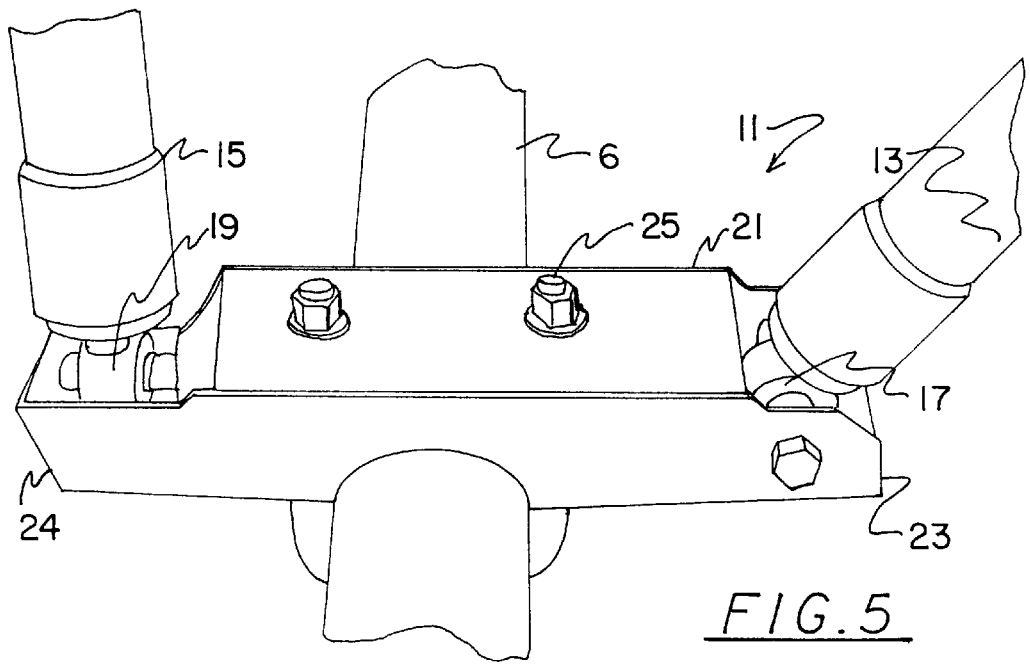
FIG. 5 is a schematic perspective view of axle mounting bracket of the present invention.
Figure 6:
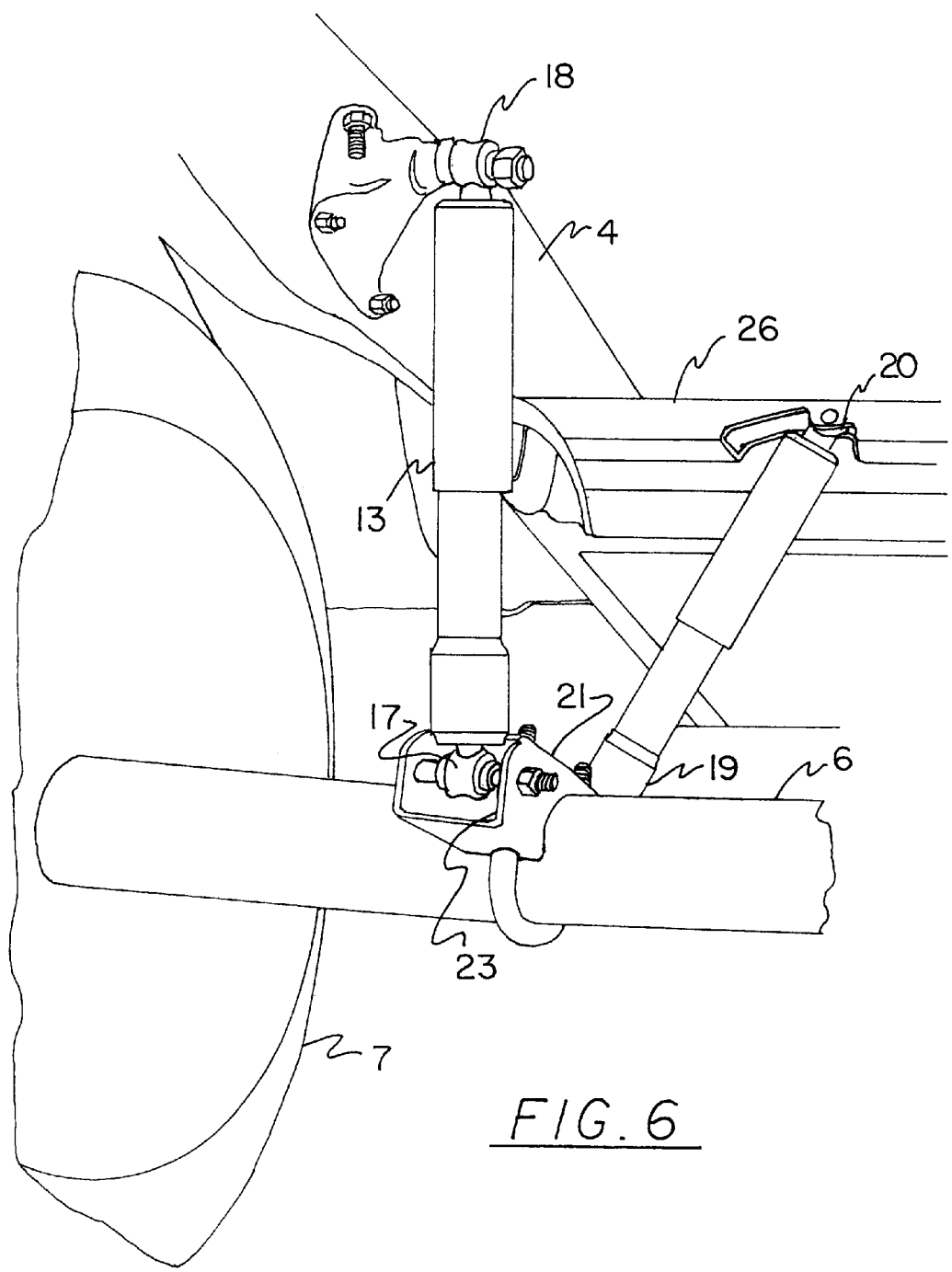
FIG. 6 is a schematic perspective view of one pair of shock absorbers of the present invention.

With reference now to the drawings, and in particular to FIGS. 1 through 6 thereof, a new dual shock absorber kit embodying the principles and concepts of the present invention and generally designated by the reference numeral 10 will be described.

As best illustrated in FIGS. 1 through 6, the dual shock absorber kit 10 generally comprises first and second pairs of shock absorbers 11,12 each comprising front and back shock absorbers 13,14,15,16. First and second axle mounting brackets 21,22 are also provided for mounting to a rear wheel axle 6 of a vehicle 1. A cross bar 26 extends between a pair of side rails 4,5 of a support frame of the vehicle 1. One end 17 of the front shock absorber 13,14 of each of the pairs of shock absorbers is coupled an associated axle mounting bracket while the other end 18 of the front shock absorber 13,14 of each of the pairs of shock absorbers is coupled to the side rail 4,5 of the support frame of the vehicle 1 adjacent the associated axle mounting bracket 21,22. One end 19 of the back shock absorber 15,16 of each of pair of shock absorbers is coupled to the associated axle mounting bracket 21,22 while the other end 20 of the back shock absorber 15,16 of each pair of shock absorbers 11,12 is coupled to the cross bar 26 at a position between the side rails 4,5 of the support frame of the vehicle 1.

The shock absorber kit 10 is designed for providing better handling for a vehicle 1, in particular a truck, having front and rear ends 2,3, a support frame comprising a spaced apart pair of side rails 4,5 extending between the front and rear ends of the vehicle 1. The vehicle 1 also has a rear wheel axle 6 extending between the side rails 4,5 and has a pair of wheels 7,8 attached thereto. In closer detail, the shock absorber kit 10 includes first and second pairs of telescopic piston-cylinder shock absorbers 11,12. Each pair of shock absorbers 11,12 comprises a front shock absorber 13,14 and a back shock absorber 15,16. Each shock absorber has a piston and a cylinder in a telescopic relationship and a pair of opposite ends 17,18,19,20 each having a mounting ring, and a longitudinal axis extending between the ends of the respective shock absorber.

Also provided are first and second axle mounting brackets 21,22 designed for mounting to the rear wheel axle 6 of a vehicle 1. The first axle mounting bracket 21 is associated with the first pair of shock absorbers 11 and the second axle mounting bracket 22 is associated with the second pair of shock absorbers 12. The first and second axle mounting brackets 21,22 each has front and back mounting ends 23,24 and a U-shaped mounting bolt 25 adapted for looping around the rear wheel axle 6 of the vehicle 1 to mount the respective mounting bracket to the rear wheel axle 6 with the mounting bracket resting on the rear wheel axle 6. The mounting bolts 25 each have a pair of threaded upper ends which are attached to their respective mounting bracket by a nut and washer. The first axle mounting bracket 21 is designed for mounting to the rear wheel axle 6 of the vehicle 1 adjacent one wheel 7 at one end of the rear wheel axle 6 and the second axle mounting bracket 22 is designed for mounting to the rear wheel axle 6 of the vehicle 1 adjacent another wheel 8 at the other end of the rear wheel axle 6. The front mounting ends 23 of the first and second axle mounting brackets 21,22 are designed for positioning towards a front end 2 of the vehicle 1 while the back mounting ends 24 of the first and second axle mounting brackets 21,22 are designed for positioning towards a rear end 3 of the vehicle 1.

A cross bar 26 is extended between the pair of side rails 4,5 of a support frame of the vehicle 1 such that the ends of the cross bar 26 are attached to the side rail of the support frame of the vehicle 1. The cross bar 26 has a length extending generally perpendicular to the side rails 4,5 of the support frame of the vehicle 1 with the cross bar 26 positioned between the rear wheel axle 6 of the vehicle 1 and the rear end 3 of the vehicle 1 towards the rear wheel axle 6 of the vehicle 1. The cross bar 26 has an elongate lower channel 27 extending along the length of the cross bar 26.

One end 17 of the front shock absorber 13,14 of each of the pairs of shock absorbers is coupled to the front mounting end 23 of the associated axle mounting bracket while the other end 18 of the front shock absorber 13,14 of each of the pairs of the shock absorbers is coupled to the side rail 4,5 of the support frame of the vehicle 1 adjacent the associated axle mounting bracket by a shock absorber mount on each of the side rails 4,5 such that the longitudinal axis of the front shock absorber 13,14 of each pair of shock absorbers extends in a direction towards the front end 2 of the vehicle 1 from the rear wheel axle 6 of the vehicle 1. One end 19 of the back shock absorber 15,16 of each of the pairs of shock absorbers is coupled to the back mounting end 24 of the associated axle mounting bracket while another end 20 of the back shock absorber 15,16 of each of the pairs of the shock absorbers is inserted into the lower channel 27 of the cross bar 26 and is coupled to the cross bar 26 by a threaded fastener at a position between the side rails 4,5 of the support frame of the vehicle 1. The longitudinal axis of the front shock absorber 13,14 of each pair of shock absorbers lies in a plane generally perpendicular to a plane in which the longitudinal axis of the associated back shock absorber 15,16 of the pair of shock absorbers lies. The longitudinal axes of the back shock absorbers 15,16 each extending at an acute angle from the length of the cross bar 26.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A shock absorber kit for a vehicle having front and rear ends, a support frame comprising a spaced apart pair of side rails extending between the front and back ends of said vehicle, a rear wheel axle extending between the side rails and having a pair of wheels attached thereto, said shock absorber kit comprising:

first and second pairs of shock absorbers, each pair of shock absorbers comprising a front shock absorber and a back shock absorber;

each shock absorber having a pair of opposite ends, and a longitudinal axis extending between said ends of the respective shock absorber;

first and second axle mounting brackets being adapted for mounting to a rear wheel axle of a vehicle, said first axle mounting bracket being associated with said first pair of shock absorbers, said second axle mounting bracket being associated with said second pair of shock absorbers;

said first axle mounting bracket being adapted for mounting to the rear wheel axle of the vehicle adjacent one wheel of the rear wheel axle, said second axle mounting bracket being adapted for mounting to the rear wheel axle of the vehicle adjacent another wheel of the rear wheel axle;

a cross bar being adapted for extending between a pair of side rails of a support frame of the vehicle;

one end of said front shock absorber of each of said pairs of shock absorbers being coupled to the associated axle mounting bracket, the other end of said front shock absorber of each of said pairs of said shock absorbers for coupling to the side rail of the support frame of the vehicle adjacent the associated axle mounting bracket; and one end of said back shock absorber of each of said pairs of shock absorbers being coupled to the associated axle mounting bracket, the other end of said back shock absorber of each of said pairs of said shock absorbers for coupling to said cross bar at a position between the side rails of the support frame of the vehicle.

2. The shock absorber kit of claim 1, wherein said first and second axle mounting brackets each have front and back mounting ends and a U-shaped mounting bolt adapted for looping around the rear wheel axle of the vehicle to mount the respective mounting bracket to the rear wheel axle.

3. The shock absorber kit of claim 2, wherein said front mounting ends of said first and second axle mounting brackets are adapted for positioning towards a front end of the vehicle, and said back mounting ends of said first and second axle mounting brackets are adapted for positioning towards a rear end of the vehicle, said one end of said front shock absorber of each of said pairs of shock absorbers being coupled to the front mounting end of the associated axle mounting bracket, and said one end of said back shock absorber of each of said pairs of shock absorbers being coupled to the back mounting end of the associated axle mounting bracket.

4. The shock absorber kit of claim 1, said cross bar is adapted for positioning between the rear wheel axle of the vehicle and the rear end of the vehicle towards the rear wheel axle of the vehicle.

5. The shock absorber kit of claim 4, wherein said cross bar has a length extending generally perpendicular to the side rails of the support frame of the vehicle.

6. The shock absorber kit of claim 5, wherein said cross bar has an elongate lower channel extending along said length of said cross bar, said the other end of said back shock absorber of each of said pairs of said shock absorbers being inserted into said lower channel of said cross bar and being coupled to said cross bar at a position between the side rails of the support frame of the vehicle.

7. The shock absorber kit of claim 1, wherein said longitudinal axis of said front shock absorber of each pair of shock absorbers lie in a plane generally perpendicular to a plane in which said longitudinal axis of the associated back shock absorber of the pair of shock absorbers lies.

8. The shock absorber kit of claim 1, wherein said longitudinal axes of said back shock absorbers each extend at an acute angle from said length of said cross bar.

9. A shock absorber kit for a vehicle having front and rear ends, a support frame comprising a spaced apart pair of side rails extending between the front and back ends of said vehicle, a rear wheel axle extending between the side rails and having a pair of wheels attached thereto, said shock absorber kit comprising:

first and second pairs of shock absorbers, each pair of shock absorbers comprising a front shock absorber and a back shock absorber;

each shock absorber having a pair of opposite ends, and a longitudinal axis extending between said ends of the respective shock absorber;

first and second axle mounting brackets being adapted for mounting to a rear wheel axle of a vehicle, said first axle mounting bracket being associated with said first pair of shock absorbers, said second axle mounting bracket being associated with said second pair of shock absorbers said first and second axle mounting brackets each having front and back mounting ends and a U-shaped mounting bolt adapted for looping around the rear wheel axle of the vehicle to mount the respective mounting bracket to the rear wheel axle;

said first axle mounting bracket being adapted for mounting to the rear wheel axle of the vehicle adjacent one wheel of the rear wheel axle, said second axle mounting bracket being adapted for mounting to the rear wheel axle of the vehicle adjacent another wheel;

said front mounting ends of said first and second axle mounting brackets being for positioning towards a front end of the vehicle;

said back mounting ends of said first and second axle mounting brackets being for positioning towards a rear end of the vehicle;

a cross bar being adapted for extending between a pair of side rails of a support frame of the vehicle;

said cross bar having a length extending generally perpendicular to the side rails of the support frame of the vehicle;

said cross bar being for positioning between the rear wheel axle of the vehicle and the rear end of the vehicle towards the rear wheel axle of the vehicle;

said cross bar having an elongate lower channel extending along said length of said cross bar;

one end of said front shock absorber of each of said pairs of shock absorbers being coupled to the front mounting end of the associated axle mounting bracket, the other end of said front shock absorber of each of said pairs of said shock absorbers for coupling to the side rail of the support frame of the vehicle adjacent the associated axle mounting bracket such that the longitudinal axis of the front shock absorber of each pair of shock absorbers extends in a direction towards the front end of the vehicle from the rear wheel axle of the vehicle;

one end of said back shock absorber of each of said pairs of shock absorbers being coupled to the back mounting end of the associated axle mounting bracket, the other end of said back shock absorber of each of said pairs of said shock absorbers being inserted into said lower channel of said cross bar and being coupled to said cross bar at a position between the side rails of the support frame of the vehicle;

said longitudinal axis of said front shock absorber of each pair of shock absorbers lying in a plane generally perpendicular to a plane in which said longitudinal axis of the associated back shock absorber of the pair of shock absorbers lies; and said longitudinal axes of said back shock absorbers each extending at an acute angle from said length of said cross bar.

* * * * *